United States Patent
Gillot et al.

(10) Patent No.: US 8,220,844 B2
(45) Date of Patent: Jul. 17, 2012

(54) THREADED ELEMENT OF A COMPONENT WITH OPPOSED THREADING PORTIONS AND CORRESPONDING TUBULAR THREADED CONNECTION

(75) Inventors: Laurent Gillot, Wargnies le Petit (FR); Eric Verger, Gommegnies (FR); Olivier Tartar, Paris (FR)

(73) Assignees: Vallourec Mannesmann Oil & Gas France, Aulnoye Aymeries (FR); Sumitomo Metal Industries, Ltd, Osaka-shi (JP)

( * ) Notice: Subject to any disclaimer, the term of this patent is extended or adjusted under 35 U.S.C. 154(b) by 260 days.

(21) Appl. No.: 12/666,486

(22) PCT Filed: Jun. 10, 2008

(86) PCT No.: PCT/EP2008/004720
§ 371 (c)(1),
(2), (4) Date: Dec. 23, 2009

(87) PCT Pub. No.: WO2009/000428
PCT Pub. Date: Dec. 31, 2008

(65) Prior Publication Data
US 2010/0171306 A1  Jul. 8, 2010

(30) Foreign Application Priority Data
Jun. 25, 2007  (FR) ...................................... 07 04538

(51) Int. Cl.
*F16L 15/00* (2006.01)
(52) U.S. Cl. .......................................  285/390; 285/334
(58) Field of Classification Search ................... 285/355, 285/390, 333, 334; 403/307
See application file for complete search history.

(56) References Cited

U.S. PATENT DOCUMENTS

| | | | | |
|---|---|---|---|---|
| 391,313 | A * | 10/1888 | Gordon | 285/333 |
| 1,019,707 | A * | 3/1912 | Wilcox | 285/334 |
| 2,239,942 | A | 4/1941 | Stone et al. | |
| 4,521,042 | A | 6/1985 | Blackburn et al. | |
| 4,629,222 | A | 12/1986 | Dearden et al. | |
| 6,155,613 | A | 12/2000 | Quadflieg et al. | |
| 6,585,299 | B1 | 7/2003 | Quadflieg et al. | |

FOREIGN PATENT DOCUMENTS

| | | |
|---|---|---|
| EA | 004409 B1 | 10/2003 |
| EP | 0 454 147 | 10/1991 |
| RU | 49 168 U1 | 11/2005 |
| WO | WO 02/06715 A1 | 1/2002 |

* cited by examiner

*Primary Examiner* — Aaron Dunwoody
(74) *Attorney, Agent, or Firm* — Oblon, Spivak. McClelland, Maier & Neustadt, L.L.P.

(57) ABSTRACT

A threaded element of a component includes at least first and second threading portions each including threads each including a stabbing flank and a loading flank. The stabbing flanks and loading flanks of the threads of the first threading portion and the threads of the second threading portion are inclined in an opposed manner with respect to the radial direction.

22 Claims, 3 Drawing Sheets

THREADED ELEMENT OF A COMPONENT WITH OPPOSED THREADING PORTIONS AND CORRESPONDING TUBULAR THREADED CONNECTION

TITLE OF THE INVENTION

BACKGROUND OF THE INVENTION

Field of Invention

The invention relates to threaded elements of components.

Discussion of the Background

The term "component" as used here means any element or accessory intended to be connected by at least two threading portions to another component to constitute with that other component a made up connection such as a threaded tubular connection.

This invention relates to any type of component which may be subjected to compressive and/or tensile (or bending) loads once connected by making up onto another corresponding component, for example with the aim of constituting a threaded tubular connection. Thus, it is particularly suitable but not limited to oil applications and the like.

The component may, for example, be a tube (optionally a great length tube), a tubular coupling (optionally a few tens of centimeters long), an accessory for those tubes (hanger, cross-over, safety valve, a connector for a drilling pipe or tool joint, sub and the like). Such components may, for example, be used to drill or exploit a well. In this case, the components are connected together for dropping into a hydrocarbon or the like well and constitute a drill string, a casing string or liner string or also a tubing string (exploitation strings).

The threaded elements which make up the components of the type cited above comprise a threading comprising threads, for example with a generally trapezoidal form, which each comprise a rectilinear crest joining a stabbing flank and a loading flank and which are separated from each other by an axial distance (or hollow or thread root) sufficiently large to house a thread of a threading of a corresponding threaded element of another component while leaving a functional axial clearance for the corresponding threads.

Said axial clearance must be sufficient to allow easy engagement of the male and female threads (especially when the loading flanks of the threads have a negative angle (hook threads), to allow them to be made up without axial interference and to avoid an overpressure of grease during makeup by absorbing dimensional variations in the threads due to machining tolerances and to radial interference of the threads at the end of makeup.

Said axial clearance is not in itself a disadvantage for the tightness of threaded connections known as "premium" connections since the tightness therein is ensured by functional sealing surfaces independent of the threads.

In contrast, it tends to reduce the performance of threaded connections subjected to axial compressive loads.

After makeup, threaded connections with trapezoidal threads (and more particularly premium threaded connections which include specific sealing surfaces and axial abutment surfaces to position the sealing surfaces) are in contact via the loading flanks, the axial clearance being disposed between the stabbing flanks. When such threaded connections are subjected to axial tensile loads (for example because of the weight of the tubes below them in the column), the threads immediately transfer these loads via their loading flanks which are already in contact. In contrast, if they have to be subjected to axial compressive loads, the threads cannot transfer such loads via their stabbing flanks before taking up the axial clearance.

However, as the skilled person is aware, under certain situations the components may at certain times be subjected to axial tensile loads and compressive axial loads at other times. This is the case, for example, in certain wells when a component designed to operate under tension is subjected to compression due to a severe temperature variation (for example when steam is injected). This is also the case with components which are dropped into deviated wells and/or which undergo relatively severe variations in direction (doglegs) and which are for this reason subjected to bending loads which result in axial tensile stresses outside the component and by compressive stresses within it. As a result, in exploitation phases during which said components are subjected to compressive loads, certain portions of their threaded elements, such as the stabbing flanks of the threads, must take up their initial axial clearance before being able to contribute to supporting those loads (otherwise supported by axial abutments if they exist), and the performances of the components under compression are reduced compared with that with tensile stresses.

As an example, European patent document EP 0 454 147 proposes using male and female threaded elements wherein the loading flanks and stabbing flanks of the threads of one of the threaded elements are, at the end of makeup, in contact with the loading flanks and stabbing flanks of the threads of the other threaded element, a radial clearance being provided between the thread roots and crests cooperating to limiting overpressure of grease. This type of threading allows the threaded connections to tolerate large loads both in tension and in axial compression (or bending). However, it is difficult to master on an industrial scale because of the dimensional tolerances of the widths of the threads and on the recesses between the threads, the threadings once made up possibly having either an axial clearance reducing their compressive performance, or having an axial interference fit occasioning poor positioning of the sealing surfaces.

With the same aim of improving compressive properties, it has also been proposed, for example in patent documents U.S. Pat. Nos. 6,155,613 and 6,585,299, to use male and female threaded elements the respective threadings of which have only slightly different pitches and very slightly different axial widths, or wherein one of the threadings comprises a central zone with a threading pitch different from the neighbouring (periodic) threading pitches. The disadvantage of those solutions resides in the fact that they are difficult to control and operate.

Document U.S. Pat. No. 4,629,222 uses threadings having, over the length of one of them, a phase change between the helices of the end thread portions, but essentially for another aim, namely that of increasing load transfer at the central threads.

SUMMARY OF THE INVENTION

The invention thus aims to improve the situation.

To this end, it provides a threaded element of a component comprising a free end and at least first and second threading portions each comprising threads each comprising a stabbing flank and a loading flank, the first threading portion being closest to the free end; the second threading portion being closest to a central non-threaded portion of the component.

It will be recalled that the stabbing flanks are those directed towards the free end of the component and which engage first during makeup, the loading flanks being directed in the direction opposite to the free end.

This threaded element is characterized in that the stabbing flanks and loading flanks of the threads of its first threading portion and the threads of the second threading portion are inclined in an "opposed" manner with respect to a radial direction.

In other words, the threads of the first and second threading portions of the threaded element have opposed inclinations, i.e. opposed with respect to the radial direction, but not necessarily of equal values.

By convention and in accordance with the usual practice, the flank angles will be defined in the present document as being negative when the end of the flank under consideration at the thread crest side overhangs the other end of the flank at the thread root, and are positive when to the opposite case (no overhang) applies.

A number of variations are possible with the threaded element of the invention, wherein at least some of the characteristics may be combined together, in particular:
  the angle of inclination (with respect to the radial direction) of the stabbing flanks of the threads of the first threading portion of a male threaded element or the second threading portion of a female threaded element may be negative;
  the angle of inclination (with respect to the radial direction) of the loading flanks of the threads of the first threading portion of a male threaded element or the second threading portion of a female threaded element may be positive;
  the absolute value of the angle of inclination (with respect to the radial direction) of the stabbing flanks of the threads of the first threading portion of a male threaded element or the second threading portion of a female threaded element may, for example, be lower than the absolute value of the angle of inclination (with respect to the radial direction) of the loading flanks of the threads respectively of the first threading portion of a male threaded element or the second threading portion of a female threaded element;
    as an example, the absolute value of the angle of inclination of the stabbing flanks of the threads of the first threading portion of a male threaded element or the second threading portion of a female threaded element may be in the range from about 3° to about 15°;
    the absolute value of the angle of inclination of the stabbing flanks of the threads of the first threading portion of a male threaded element or the second threading portion of a female threaded element may be in the range from about 10° to about 30°;
  in a variation, the absolute value of the angle of inclination (with respect to the radial direction) of the stabbing flanks of the threads of the second threading portion of a male threaded element or of the first threading portion of a female threaded element may, for example, be greater than the absolute value of the angle of inclination (with respect to the radial direction) of the loading flanks of the threads respectively of the second threading portion of a male threaded element or the first threading portion of a female threaded element;
    as an example, the absolute value of the angle of inclination of the loading flanks of the threads of the second threading portion of a male threaded element or the first threading portion of a female threaded element may be in the range from about 3° to about 15°;
    as an example, the absolute value of the angle of inclination of the stabbing flanks of the threads of the second threading portion of a male threaded element or the first threading portion of a female threaded element may be in the range from about 10° to about 30°;
  the algebraic value of the angle of inclination of the stabbing flanks of the threads of the first threading portion may be substantially equal to the algebraic value of the angle of inclination of the loading flanks of the threads of the second threading portion;
  the algebraic value of the angle of inclination of the loading flanks of the threads of the first threading portion may be substantially equal to the algebraic value of the angle of inclination of the stabbing flanks of the threads of the second threading portion;
  the first and second threading portions may be tapered;
    in this case, the second threading portion may, for example, be formed after a radial shoulder of the desired radial extension;
    in a variation, the first and second threading portions may, for example, be disposed substantially on the same tapered surface;
  in a variation, the first and second threading portions may be straight and formed at first and second radial distances from the longitudinal axis of said component;
  the first and second threading portions may be axially separated by an intermediate zone which extends over an axial distance selected so as to absorb external loads and/or to take up an axial clearance between the first or second threading portion of a threaded element and respectively the second or first portion of the threading of a matching threaded element, by essentially elastic deformation;
    the axial extent of the intermediate zone may be proportional to the maximum value of the axial clearance;
    the minimum value of the axial clearance may be an increasing function of the thread height and the absolute value of the negative angle of the flank;
    at least a portion of the intermediate zone may define a sealing surface which can come into tight interference contact with a corresponding sealing surface of another threaded element.

The invention also proposes a threaded tubular connection comprising a male threaded element and a female threaded element which are of the type described above, and which correspond, to be able to be made up one into the other.

As an example, the first and second threading portions may be disposed so that, once made up and in the absence of external tensile, compressive or bending loads, on the one hand the stabbing flanks of the threads of the first threading portion of the female threaded element be in contact with those of the second threading portion of the male threaded element corresponding thereto, and on the other hand the loading flanks of the threads of the second threading portion of the female threaded element be in contact with those of the first threading portion of the male threaded element which correspond thereto, providing on the one hand a first buffer zone between the loading flanks of the threads which correspond thereto in the first threading portion of the female threaded element and in the second threading portion of the male threaded element, and on the other hand a second buffer zone between the stabbing flanks of the threads which correspond thereto in the second threading portion of the female threaded element and in the first threading portion of the male threaded element. The first buffer zones are thus intended to take up an axial clearance in the presence of a tensile load and the second buffer zones are intended to take up an axial clearance in the presence of a compressive load.

BRIEF DESCRIPTION OF THE DRAWINGS

Other characteristics and advantages of the invention will become apparent from the following detailed description and the accompanying drawings, in which.

The accompanying drawings will not only serve to explain the invention, but also to contribute to its definition as appropriate.

DETAILED DESCRIPTION OF THE PREFERRED EMBODIMENTS

The invention aims to provide male and female threaded elements of components, possibly threaded tubular connections, capable of tolerating, in a controlled manner, high levels of compressive as well as tensile loads, or high levels of bending loads, or even these loads in alternation.

In the following, it is assumed that the component is intended for drilling or exploitation of hydrocarbon wells and that it is provided with at least one male or female threaded element of a coupled or integral threaded tubular connection. The invention concerns any type of component (OCTG casing, liner or tubing, coupling, drill string, drilling accessory or well accessory, and the like), regardless of its use, provided that it includes at least one male or female threaded element provided with at least two threading portions which can be made up onto two threading portions of a male or female threaded element of another component to constitute a made up assembly with this other component, a non-limiting example being a threaded tubular connection. In general, the invention concerns any type of component which can undergo external compressive and/or tensile or bending loads once connected by making up onto another corresponding component.

Figure 1:
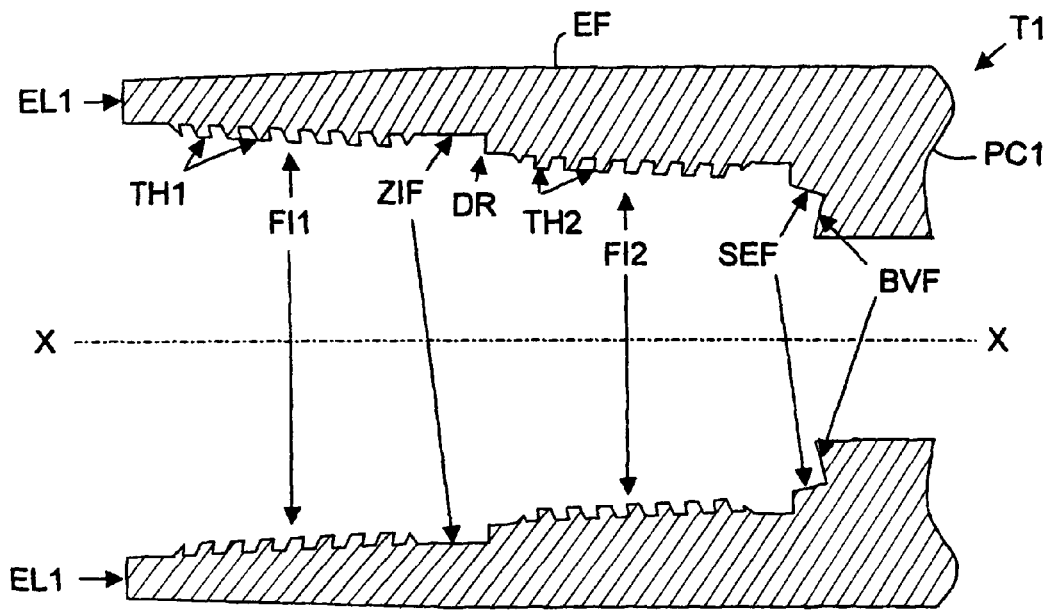
FIG. 1 diagrammatically shows, in a cross section along the longitudinal axis XX, an example of an embodiment of a female threaded element of a first component of a threaded tubular connection of the "flush" type.
Figure 2:
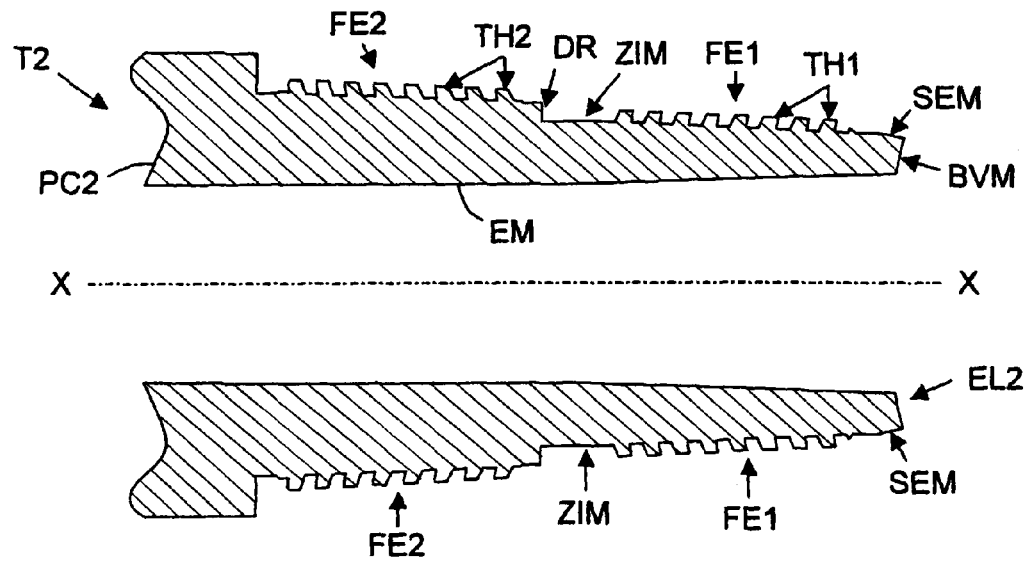
FIG. 2 diagrammatically shows, in a cross section along the longitudinal axis XX, an example of an embodiment of a male threaded element of a second component of a flush type threaded tubular connection.

As can be seen in FIGS. 1 and 2, a component Ti (i=1 or 2) comprises a body or regular or central portion PCi prolonged by a female threaded element (or end) EF or male threaded element EM terminated by a free end ELi.

The free end ELi of the female threaded element EF or male EM serves here as a reference. As a result, all that which lies, with respect to a given transverse plane, between said plane and a free end ELi is said to be upstream of that plane.

A female threaded element EF of the invention (see FIG. 1) comprises at least first FI1 and second FI2 distinct portions of the interior threading.

The term "interior" as used here means a portion disposed on a surface (or a surface) which is orientated towards the longitudinal axis XX of the female threaded element EF or male threaded element EM. The radial direction is that which is perpendicular to the longitudinal axis XX.

Figure 4:
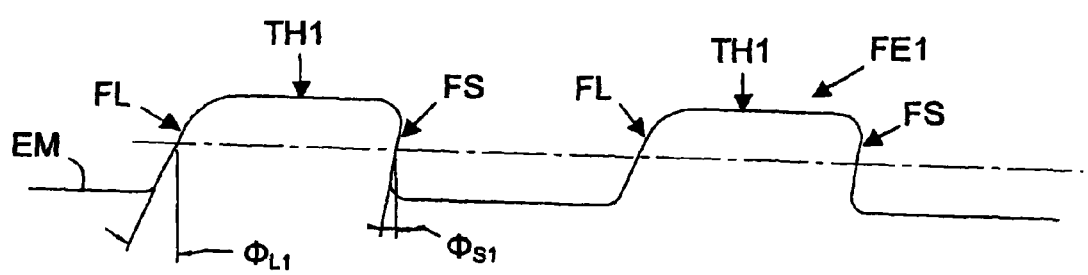
FIG. 4 diagrammatically shows, in a cross section along the longitudinal axis XX, an example of an embodiment of the threads of a first threading portion of a male threaded element of the type shown in FIG. 2.
Figure 5:
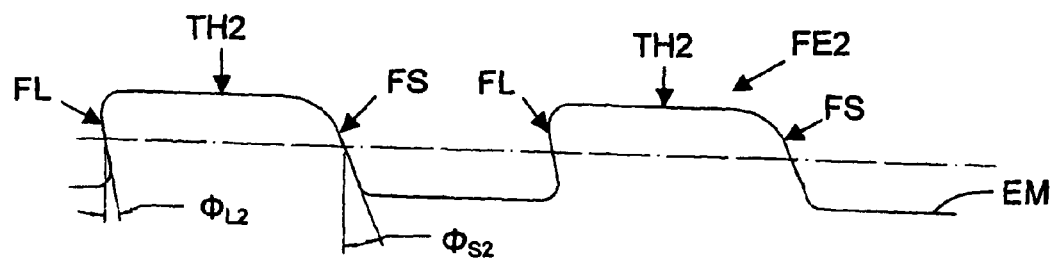
FIG. 5 diagrammatically shows, in a cross section along the longitudinal axis XX, an example of an embodiment of the threads of a second threading portion of a male threaded element of the type shown in FIG. 2.

Further, the term "threading portion" as used here means a zone in which threads TH1 or TH2 are formed each defined by a stabbing flank FS and a loading flank FL (see FIGS. 4 and 5). According to the definition given above, the stabbing flank of a thread TH1 or TH2 is normally placed upstream of the loading flank FL of the same thread TH1 or TH2. The thread pitch is generally constant for a given threading portion. Further, the radial height of the threads is also generally constant, but it could be increasing or decreasing (as is the case with run-in or run-out threadings).

The first interior threading portion FI1 is that which is placed closest to the free end EL1 of the first component T1. The second interior threading portion FI2 is that which is placed closest to the non-threaded portion (and thus the body PC1) of the first component T1.

In the example shown in FIG. 1, the interior threading portion FI1 is placed downstream of the free end EL1, the second interior threading portion FI2 is placed downstream of the interior threading portion FI1, which may be placed upstream of a makeup abutment BVF (as shown). This makeup abutment BVF is, for example, in the form of an internal surface which is of the reverse tapered annular type.

As shown in FIG. 1, the female threaded element EF may also and optionally comprise a metal/metal sealing surface SEF interposed between the second interior threading portion FI2 and the makeup abutment BVF.

A male threaded element EM of the invention (see FIG. 2) comprises at least one first FE1 and second FE2 exterior threading portions.

The term "exterior" as used here means an element disposed along a surface (or a surface) which is orientated in a direction radially opposite to the longitudinal axis XX of the male EM or female EF threaded element.

The exterior first threading portion FE1 is that which is placed closest to the free end EL2 of the second component T2. The second exterior threading portion FE2 is that which is placed closest to the regular portion or central portion (and thus the body PC2) of the second component T2.

In the example shown in FIG. 2, the first exterior threading portion FE1 is placed downstream of the free end EL2, the second exterior threading portion FE2 is placed downstream of the first exterior threading portion FE1, which is placed upstream of a makeup abutment BVM (as shown). This makeup abutment BVM is, for example, in the form of a reverse tapered annular end surface placed upstream of the first exterior threading portion FE1 at the free end EL2. It is intended to bear on the corresponding makeup abutment BVF of the female threaded element EF at the end of the makeup cycle (see FIG. 3).

As shown in FIG. 2, the male threading element EM may also and optionally comprise a metal/metal SEM sealing surface interposed between the first exterior threading portion FE1 and the makeup abutment BVM. This metal/metal sealing surface SEM is intended to bear on the corresponding metal/metal sealing surface SEF of the female threaded element EF at the end of the makeup so as to establish a tight interference fit.

It should be noted that the interior threading portions FI1 and FI2, like the exterior threading portions FE1 and FE2, may be disposed on straight or tapered surfaces, provided that they allow access to the threads TH2 of the second interior threading FI2 or exterior FE2 portion.

As a result, a number of configurations may be envisaged. Thus, when the first FI1 or FE1 and second FE2 or FE2 threading portions are tapered, the second threading portion FI2 or FE2 may, for example (and as shown in FIGS. 1 and 2) be formed downstream of a radial shoulder DR of the desired radial extension. Further and as shown in FIGS. 1 and 2, the second threading portion FI2 or FE2 is preferably separated from the first threading portion FI1 or FE1 by an intermediate non-threaded zone ZIF or ZIM and desired axial extension.

This intermediate zone ZIF or ZIM is intended to facilitate access to threads TH2 of the second interior FI2 or exterior FE2 threading portion and to reduce or cancel the effect of an axial threading clearance which is necessary for making up the opposed threaded portions.

In a variation, not shown, the first FI1 or FE1 and second FI2 or FE2 threading portions may, for example, constitute two portions of the same tapered threading. In this case, it is preferable that the first FI1 or FE1 and second FI2 or FE2 threading portions are axially separated by an intermediate non-threaded zone which may be tapered (but possibly straight) and with a desired axial extension, intended to facilitate access to threads TH2 of the interior second FI2 or exterior FE2 threading portion and to reduce or cancel the effect of an axial threading clearance which is necessary to making up the opposed threaded portions.

In another variation, not shown, the first FI1 or FE1 and second FI2 or FE2 threading portions may, for example, be straight. In this case, they must obligatorily be formed at first and second radial distances from the longitudinal axis XX. In the case of a female threaded element EF, the first radial distance which separates the longitudinal axis XX from the first interior threading portion FI1 must be greater than the second radial distance which separates the longitudinal axis XX from the second interior threading portion FI2. In the case of a male threaded element EM, the radial first distance which separates the longitudinal axis XX from the first exterior threading portion FE1 must be lower than the second radial distance which separates the longitudinal distance XX from the second exterior threading portion FE2.

Figure 3:
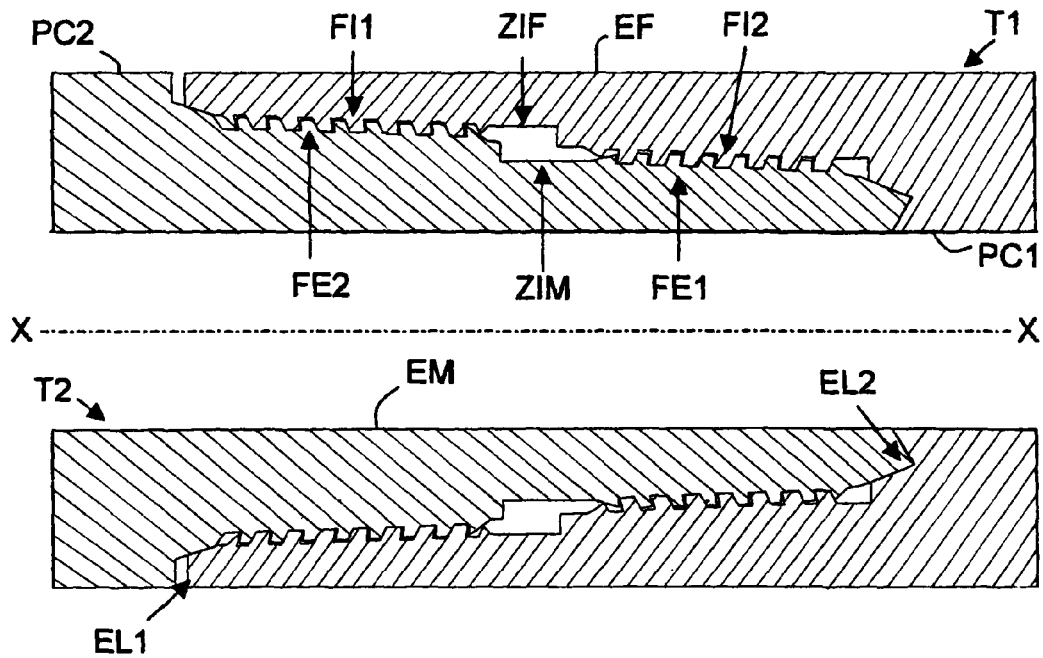
FIG. 3 diagrammatically shows, in a cross section along the longitudinal axis XX, an example of an embodiment of a threaded tubular connection constituted by a connection formed by male and female threaded elements of the type shown in FIGS. 1 and 2.

As can be seen in FIG. 3, a threaded tubular connection is constituted by making up a female threaded element EF of a first component T1 (of the type shown in FIG. 1) onto a male threaded element EM of a second component T2 (of the type shown in FIG. 2).

In accordance with the invention, in each female EF or male EM threaded element the stabbing flanks FS and the loading flanks FL of the threads TH1 of the first threaded portion FI1 or FE1 of the threads TH2 of the second threading portion FI2 or FE2 are inclined in an antagonistic manner (i.e. opposing) with respect to the radial direction. This configuration is shown in FIGS. 4 and 5 in the case of a male threaded element EM of the type shown in FIG. 2. More precisely, in the non-limiting example shown in FIGS. 2, 4 and 5, the stabbing flanks FS and the loading flanks FL of the threads TH1 of the first exterior threading portion FE1 are inclined (or orientated) towards the free end EL2 of the second component T2 so that the end of the stabbing flank FS and the end of the loading flank FL on the thread crest side respectively overhangs and does not overhang the other end of these flanks at the thread root, while the stabbing flanks FS and the loading flanks FL of the threads TH2 of the second exterior threading portion FE2 are inclined (or orientated) towards the non-threaded portion (or body) CP2 of the same second component T2, so that the end of the stabbing flank FS and the end of the loading flank FL on the thread crest side respectively doe not overhang and overhangs the other end of these flanks at the thread root. Similarly, in the non-limiting example shown in FIG. 1, the stabbing flanks FS and loading flanks FL of the threads TH1 of the first interior threading portion FI1 are inclined (or orientated) towards the non-threaded portion (or body) CP1 of the first component T1 so that the end of the stabbing flank FS and the end of the loading flank FL on the thread crest side respectively does not overhang and overhangs the other end of these flanks at the thread root, while the stabbing flanks FS and the loading flanks FL of the threads TH2 of the second exterior threading portion FE2 are inclined (or orientated) towards the free end EL1 of that same first component T1 so that the end of the stabbing flank FS and the end of the loading flank FL on the thread crest side respectively overhangs and does not overhang the other end of said flanks at the thread root.

The angle of inclination between a loading flank FL of a thread TH1 of the first exterior threading portion FE1 and the radial direction is denoted $\Phi_{L1}$. The angle of inclination between a stabbing flank FS of a thread TH1 of the first exterior threading portion FE1 and the radial direction is denoted $\Phi_{S1}$. The angle of inclination between a loading flank FL of a thread TH2 of the second exterior threading portion FE2 and the radial direction is denoted $\Phi_{L2}$. The angle of inclination between a stabbing flank FS of a thread TH2 of the second exterior threading portion FE2 and the radial direction is denoted $\Phi_{S2}$.

If, for example, we assume that the angles of inclination are positive when the end of the flank concerned on the thread crest side does not overhang the other end of that flank at the thread root, and negative when the end of the flank concerned on the thread crest side overhangs the other end of that flank at the thread root, then in the example shown, the angles $\Phi_{L1}$ and $\Phi_{S1}$ are respectively positive and negative, while the angles $\Phi_{L1}$ and $\Phi_{S2}$ are respectively negative and positive in the case of the male threaded element EM. The converse is observable on the example of a female threaded element EF in FIG. 1. In this case, the angles $\Phi_{L1}$ and $\Phi_{S1}$ of the flanks FL and FS of threads TH1 of the first interior threading portion fl1 are respectively negative and positive, while the angles $\Phi_{L2}$ and $\Phi_{S2}$ of the flanks FL and FS of threads TH2 of the second interior threading portion FI2 are respectively positive and negative.

It should be noted that the reverse situation may be envisaged. In this case, angles $\Phi_{L1}$ and $\Phi_{S1}$ of flanks FL and FS of threads TH1 of the first interior threading portion FI1 are respectively positive and negative, the angles $\Phi_{L2}$ and $\Phi_{S2}$ of flanks FL and FS of threads TH2 of the second interior threading portion FI2 are respectively negative and positive, the angles $\Phi_{L1}$ and $\Phi_{S1}$ of flanks FL and FS of threads TH1 of the first exterior threading portion FE1 are respectively negative and positive, and the angles $\Phi_{L2}$ and $\Phi_{S2}$ of flanks FL and FS of threads TH2 of the second exterior threading portion FE2 are respectively positive and negative.

It should also be noted that angles $\Phi_{L1}$ and $\Phi_{S1}$ of flanks FL and FS of threads TH1 of the first exterior threading portion FE1 or interior threading portion FI1 may be identical or different (as is the case in the example shown in FIGS. 1, 2 and 4). Preferably, the absolute value of the angle of inclination $\Phi_{S1}$ of the stabbing flank FS of threads TH1 of the first exterior threading portion FE1 is lower than the absolute value of the angle of inclination $\Phi_{L1}$ of the loading flanks FL of threads TH1 of that same first exterior threading portion FE1. As an example, the absolute value of the angle of inclination $\Phi_{S1}$ of stabbing flanks FS of threads TH1 of the first exterior threading portion FE1 may be in the range from about 3° to about 15°. As an example, $\Phi_{S1}$ may be selected as being equal to −10°. The absolute value of the angle of inclination $\Phi_{L1}$ of the loading flanks FL of the threads TH1 of the first exterior threading portion FE1 may, for example, be in the range from about 10° to about 30°. As an example, $\Phi_{L1}$ may be selected to be equal to +25°.

Preferably again, the absolute value of the angle of inclination $\Phi_{S2}$ of the stabbing flanks FS of threads TH2 of the second exterior threading portion FE2 is higher than the absolute value of the angle of inclination $\Phi_{L2}$ of the loading flanks FL of threads TH2 of that same second exterior threading portion FE2. As an example, the absolute value of the angle of inclination $\Phi_{S2}$ of the stabbing flanks FS of threads TH2 of the second exterior threading portion FE2 may be in the range from about 10° to about 30°. As an example, $\Phi_{S2}$ may be selected as being equal to +25°. The absolute value of the angle of inclination $\Phi_{L2}$ of the loading flanks FL of the threads TH2 of the second exterior threading portion FE2 may, for example, be in the range from about 3° to about 15°. As an example, $\Phi_{L2}$ may be selected to be equal to −10°.

Similarly, the absolute value of the angle of inclination $\Phi_{S1}$ of the stabbing flanks FS of threads TH1 of the first interior threading portion FI1 is preferably higher than the absolute value of the angle of inclination $\Phi_{L1}$ of the loading flanks FL of threads TH1 of that same first interior threading portion FI1. As an example, the absolute value of the angle of inclination $\Phi_{S1}$ of the stabbing flanks FS of threads TH1 of the first interior threading portion FI1 may be in the range from about 10° to about 30°. As an example, $\Phi_{S1}$ may be selected as being equal to +25°. The absolute value of the angle of inclination $\Phi_{L1}$ of the loading flanks FL of the threads TH1 of the first interior threading portion FI1 may, for example, be in the range from about 3° to about 15°. As an example, $\Phi_{L1}$ may be selected to be equal to −10°.

Preferably again, the absolute value of the angle of inclination $\Phi_{S2}$ of the stabbing flanks FS of threads TH2 of the second interior threading portion FI2 is lower than the absolute value of the angle of inclination $\Phi_{L2}$ of the loading flanks FL of threads TH2 of that same second interior threading portion FI2. As an example, the absolute value of the angle of inclination $\Phi_{S2}$ of the stabbing flanks FS of threads TH2 of the second interior threading portion FI2 may be in the range from about 3° to about 15°. As an example, $\Phi_{S2}$ may be selected as being equal to −10°. The absolute value of the angle of inclination $\Phi_{L1}$ of the loading flanks FL of the threads TH2 of the second interior threading portion FI2 may, for example, be in the range from about 10° to about 30°. As an example, $\Phi_{L2}$ may be selected to be equal to +25°.

Preferably, regardless of the thread flank and the threading portion, the absolute value of the negative angles is less than that of the positive angles. Thus in the non-limiting example of FIG. 3, the absolute value of the angle $\Phi_{S1}$ (10°) is less than that of the angle $\Phi_{L1}$ (25°).

It should also be noted that preferably, the angle of inclination $\Phi_{S1}$ of the stabbing flanks FS of the threads TH1 of the first interior threading portion FI1 is substantially equal to the angle of inclination $\Phi_{S2}$ of the stabbing flanks FS of the threads TH2 of the second exterior threading portion FE2. Similarly, the angle of inclination $\Phi_{L1}$ of the loading flanks FL of the threads TH1 of the first interior threading portion FI1 is preferably substantially equal to the angle of inclination $\Phi_{L2}$ of the loading flanks FL of the threads TH2 of the second exterior threading portion FE2.

It should also be noted that the axial length of the first interior threading portion FI1 (or exterior FE1) of a female threaded element EF (or male EM) is preferably equal to that of the second interior threading portion FI2 (or exterior FE2) of the same female threaded element EF (or male EM). However, the axial length of the threading portions may be selected as a function of other criteria, for example, and in a non-limiting manner, to equilibrate the developed surfaces of the loading flanks FL or the stabbing flanks FS of the first and second threading portions of the same threading.

Figure 6A:
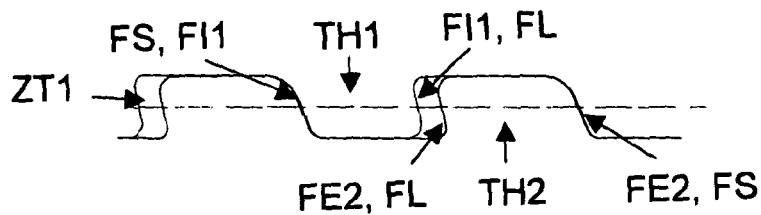
FIG. 6A diagrammatically shows, in a cross section along the longitudinal axis XX, an example of the cooperation of the threads of a second threading portion of a male threaded element of the type shown in FIG. 2 and the threads of a first threading portion of a female threaded element of the type shown in FIG. 1, at the end of the makeup cycle in the absence of external loads.
Figure 6B:
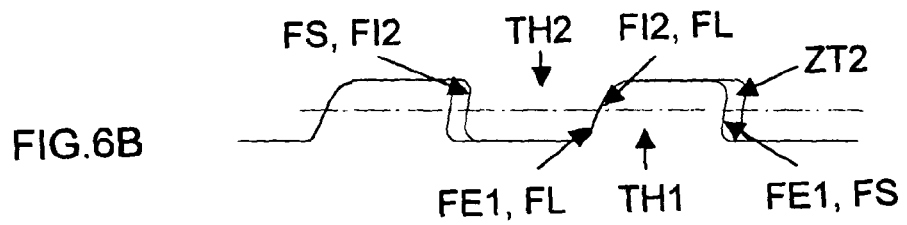
FIG. 6B diagrammatically shows, in a cross section along the longitudinal axis XX, an example of the cooperation of the threads of a first threading portion of a male threaded element of the type shown in FIG. 2 and the threads of a second threading portion of a female threaded element of the type shown in FIG. 1, at the end of the makeup cycle and in the absence of external loads.

FIGS. 6A and 6B show in diagrammatic manner (in cross section along the longitudinal axis XX) the respective positions of threads TH2 of a second exterior threading portion FE2 of a male threaded element EM and threads TH1 of a first interior threading portion FI1 of a female threaded element EF, at the end of a makeup cycle for first T1 and second T2 components and in the absence of external loads. As can be seen in FIGS. 6A and 6B, the respective arrangements of the first threading portions FI1 and FE1 and the second threading portions FI2 and FE2 enable to define:

a first buffer zone ZT1 between the loading flanks FL of threads TH1 and TH2 which respectively correspond in the first interior threading portion FI1 (of the female threaded element EF) and in the second exterior threading portion FE2 (of the male threaded element EM); and a second buffer zone ZT2 between the stabbing flanks FS of threads TH2 and TH1 which respectively correspond in the second interior threading portion FI2 (of the female threaded element EF) and in the first exterior threading portion FE1 (of the male threaded element EM).

In the absence of external load, the antagonistic (opposed) inclinations of the threads of the first FI1 and second FI2 interior threading portions of the female threaded element EF, combined with the antagonistic (opposed) inclinations of the threads of the first FE1 and second FE2 exterior threading portions of the male threaded element EM ensures that the stabbing flanks FS of the threads TH1 and TH2, respectively of the first interior threading portion FI1 and the second exterior threading portion FE2, bear on each other, and at tilt same time the loading flanks FL, of threads TH2 and TH1, respectively of the second interior threading portion FI2 and the first exterior threading portion FE1, bear on each other. This results in a wedging effect which ensures radial locking of the first T1 and second T2 components, which substantially improves the overall integrality of their connection.

Figure 7A:
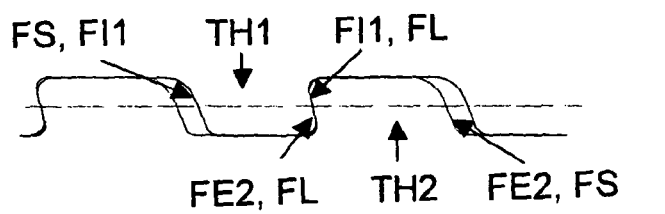
FIG. 7A diagrammatically shows, in a cross section along the longitudinal axis XX, an example of the cooperation of the threads of a second threading portion of a male threaded element of the type shown in FIG. 2 and the threads of a first threading portion of a female threaded element of the type shown in FIG. 1, at the end of the makeup cycle and in the presence of axial tensile loads.
Figure 7B:
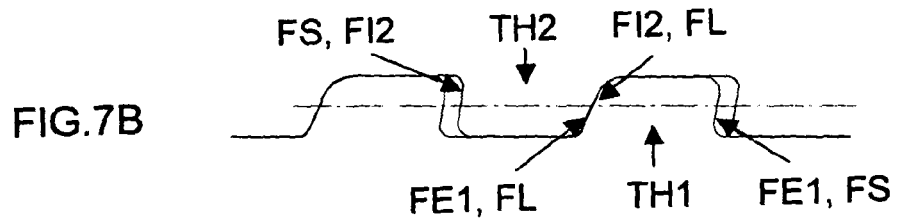
FIG. 7B diagrammatically shows, in a cross section along the longitudinal axis XX, an example of the cooperation of the threads of a first threading portion of a male threaded element of the type shown in FIG. 2 and the threads of a second threading portion of a female threaded element of the type shown in FIG. 1, at the end of the makeup cycle and in the presence of axial tensile loads.
Figure 8A:
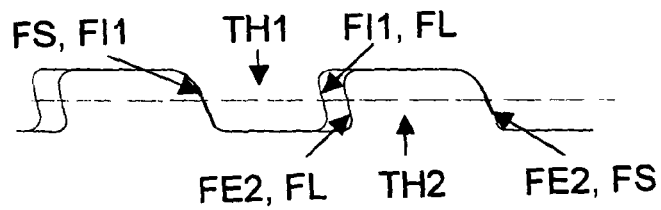
FIG. 8A diagrammatically shows, in a cross section along the longitudinal axis XX, an example of the cooperation of the threads of a second threading portion of a male threaded element of the type shown in FIG. 2 and the threads of a first threading portion of a female threaded element of the type shown in FIG. 1, at the end of the makeup cycle and in the presence of axial compressive loads.
Figure 8B:
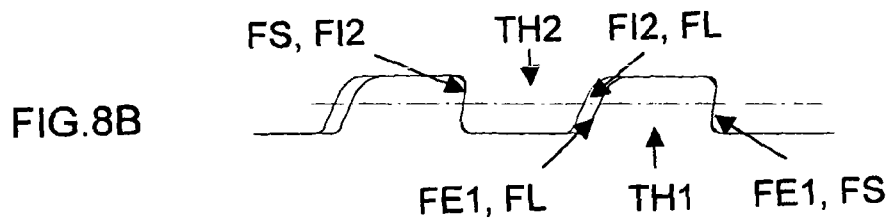
FIG. 8B diagrammatically shows, in a cross section along the longitudinal axis XX, an example of the cooperation of the threads of a first threading portion of a male threaded element of the type shown in FIG. 2 and the threads of a second threading portion of a female threaded element of the type shown in FIG. 1, at the end of the makeup cycle and in the presence of axial compressive loads.

As can be seen in FIGS. 7A and 7B, the axial clearance of the first buffer zones ZT1 is intended to be taken up during axial tensile load, while as shown in FIGS. 8A and 8B, the axial clearance of the second buffer zones ZT2 is intended to be taken up during axial compressive load. It will thus be understood that in the presence of axial compressive and tensile loads (for example on opposite generatrices during bending), the first ZT1 and second ZT2 buffer zones are used on the same connection to take up the axial clearances. This latter situation corresponds in some way to a combination of FIGS. 7A, 7B on one generatrix and 8A, 8B on the opposite generatrix.

The axial extensions (axial clearances) of the first ZT1 and second ZT2 buffer zones shown in FIGS. 6 to 8 have been deliberately exaggerated to make them easier to understand. In other words, the axial clearances which they can take up are exaggerated compared with the actual situation.

The intermediate zone ZIF or ZIM, which is located between the first FI1 or FE1 and second FI2 or FE2 threading portions, is also useful in the presence of axial compressive and/or tensile loads. In the presence of axial tensile loads (see FIGS. 7A and 7B), once the axial clearances of the first buffer zones ZT1 have been taken up, the tensile loads are taken up by all of the loading flanks FL of the first interior threading portions FI1 and exterior threading portions FE1 and second interior threading portions FI2 and exterior threading portions FE2. More precisely, once the axial clearances have been taken up, the traction induces a supplemental contact between the loading flanks FL of the first interior threading portion FI1 and the second exterior threading portion FE2, which supplemental contact can take up part of the load and thus relieve the loads to which the second interior threading portion FI1 and first exterior threading portion FE2 are subjected. The intermediate zone ZIM will then guarantee this clearance take up by elastic deformation (and thus without notable permanent alteration) in axial tension, thereby allowing the coupling (in this case a threaded tubular connection) to return to a condition identical to or close to its initial condition when the load is released.

The action of the intermediate zone ZIF in the presence of axial compressive loads (see FIGS. 8A and 8B) is similar to that described above for the intermediate zone ZIM in the case of tensile loads. The difference lies in the fact that the loads are taken up by all of the stabbing flanks FS of the first interior threading portions FI1 and exterior threading portions FE1 and second interior FI2 and exterior FE2 threading portions and in that the intermediate zone ZIF will enable to ensure that the clearance is taken up by elastic deformation in axial compression.

The axial extent of the minimum cross section portion of the intermediate zones ZIM, ZIF is preferably selected so as not to be plasticized before take up of the axial clearance of the corresponding buffer zones, respectively ZT1, ZT2.

Highly preferably, the axial extent of the minimum cross section portion of the intermediate zones ZIM, ZIF is an increasing linear function of the maximum axial extent of the corresponding buffer zones ZT1, ZT2. The maximum axial extent of these buffer zones is equal to the maximum axial clearance between the threading portions FE2-FI1 or FE1-FI2 depending on the case, taking into account the dimensional tolerances on the threadings.

Thus, by way of example, for elastic limits of the order of 700 MPa (grade C95 of specification API 5CT), the axial extent or length of the minimum cross section portion of the intermediate zones ZIM, ZIF may be equal to about 200 times the maximum axial clearance of the threadings if plastic deformation of the intermediate zone is effectively not tolerated. It may be about 100 times the axial clearance if a small amount of plastic deformation is tolerated.

The maximum axial extent of the buffer zones ZT1, ZT2 may be equal to the minimum axial clearance between the threading portions FE2-FI1 or FE1-FI2 depending on the case, supplemented by the dimensional machining tolerance of the axial clearances.

The minimum axial extent of the buffer zones ZT1, ZT2 (which is equal to the minimum axial clearance between the threading portions FE2-FI1 or FE1-FI2 depending on the case) is preferably selected to avoid premature galling due to the negative flank angles. In this case, it is preferably an increasing function of the threading height and the absolute value of the negative flank angle. More preferably, it may be equal to $h.\tan(\Phi_{L2})$; $\Phi_{L2}$ being the loading flank angle of the second exterior threading portion FE2.

It should be noted that the intermediate zones ZIM and ZIF may also define (at least partially) metal/metal sealing surfaces if products are required having reduced radial bulk. This is particularly the case with components of threaded connections known as "integral semi-flush" connections which may thus comprise a first metal/metal sealing surface between their first FI1 or FE1 and second FI2 or FE2 threading portions and a second metal/metal sealing surface either downstream of their second interior threading portion FI2 in the case of a female threaded element EF or upstream of their first exterior threading portion FE1 in the case of a male threaded element EM.

The invention is not limited to the embodiments of the threaded element (male or female), the component and the threaded tubular connection described above solely by way of example, but they encompass all variations which the skilled person may envisage in the context of the claims below.

Thus, the invention also concerns other types of male and female threaded element than those described above. As an example, it also concerns threaded elements of threaded tubular connections with internal abutments, coupled (for example those of the VAM TOP, NEW VAM, VAM ACE, DINOVAM, VAM HW ST type) or integral "flush" or "semi-flush" (for example those of the VAM SL, VAM MUST, VAM HP type). The invention also concerns male and female threaded elements of connections with no internal abutment (for example of the VAM SLIJ II type with a central abutment or VAM FJL with an external abutment).

The invention claimed is:
1. A threaded element of a component, comprising:
a free end and at least first and second threading portions each comprising threads each comprising a stabbing flank and a loading flank, said first threading portion being closest to said free end and said second threading portion being closest to a central non-threaded portion of said component,
wherein the stabbing flanks and the loading flanks of the threads of said first threading portion and the threads of said second threading portion are inclined in an opposed manner with respect to a radial direction, in a cross section along a longitudinal axis of the said element.

2. A threaded element according to claim 1, wherein an angle of inclination with respect to the radial direction of the stabbing flanks of the threads of the first threading portion of a male threaded element or of the second threading portion of a female threaded element is negative.

3. A threaded element according to claim 1, wherein an angle of inclination with respect to the radial direction of the loading flanks of the threads of the first threading portion of a male threaded element or of the second threading portion of a female threaded element is positive.

4. A threaded element according to claim 1, wherein the absolute value of an angle of inclination with respect to the radial direction of the stabbing flanks of the threads of the first threading portion of a male threaded element or of the second threading portion of a female threaded element is lower than the absolute value of an angle of inclination with respect to the radial direction of the loading flanks of the threads of the first threading portion of a male threaded element or of the second threading portion of a female threaded element.

5. A threaded element according to claim 4, wherein the absolute value of an angle of inclination of the stabbing flanks of the threads of the first threading portion of a male threaded element or the second threading portion of a female threaded element is in a range from about 3° to about 15°.

6. A threaded element according to claim 4, wherein the absolute value of an angle of inclination of the loading flanks of the threads of the first threading portion of a male threaded element or of the second threading portion of a female threaded element is in a range from about 10° to about 30°.

7. A threaded element according to claim 1, wherein the absolute value of an angle of inclination with respect to the radial direction of the stabbing flanks of the threads of said second threading portion of a male threaded element or of the first threading portion of a female threaded element is greater than the absolute value of an angle of inclination with respect to the radial direction of the loading flanks of the threads respectively of said second threading portion of a male threaded element or of the first threading portion of a female threaded element.

8. A threaded element according to claim 7, wherein the absolute value of an angle of inclination of the loading flanks of the threads of said second threading portion of a male threaded element or of the first threading portion of a female threaded element is in a range from about 3° to about 15°.

9. A threaded element according to claim 7, wherein the absolute value of an angle of inclination of the stabbing flanks of the threads of said second threading portion of a male threaded element or the first threading portion of a female threaded element is in a range from about 10° to about 30°.

10. A threaded element according to claim 4, wherein the algebraic value of an angle of inclination of the stabbing flanks of the threads of said first threading portion is substantially equal to the algebraic value of an angle of inclination of the loading flanks of the threads of said second threading portion.

11. A threaded element according to claim 4, wherein the algebraic value of an angle of inclination of the loading flanks of the threads of said first threading portion is substantially equal to the algebraic value of an angle of inclination of the stabbing flanks of the threads of said second threading portion.

12. A threaded element according to claim 1, wherein said first and second threading portions are tapered.

13. A threaded element according to claim 12, wherein said second threading portion is formed after a radial shoulder of a desired radial extension.

14. A threaded element according to claim 12, wherein said first and second threading portions are disposed substantially on a same tapered surface.

15. A threaded element according to claim 1, wherein said first and second threading portions are straight and formed at first and second radial distances from a longitudinal axis of said component.

16. A threaded element according to claim 1, wherein said first and second threading portions are axially separated by an intermediate zone which extends over an axial distance selected so as to absorb external loads and/or to take up an axial clearance between the first or second threading portion of a threaded element and respectively the second or first threading portion of a matching threaded element, by essentially elastic deformation.

17. A threaded element according to claim 16, wherein the axial extent of the intermediate zone is proportional to the maximum value of said axial clearance.

18. A threaded element according to claim 16, wherein the minimum value of the axial clearance is an increasing function of thread height and the absolute value of negative angle of the flank.

19. A threaded element according to claim 16, wherein at least a portion of said intermediate zone defines a sealing surface that can come into tight interference contact with a corresponding sealing surface of another threaded element.

20. A threaded tubular connection, comprising:
   a threaded male type element and a threaded female type element in accordance with claim 11, which match so that they can be made up one into the other.

21. A threaded tubular connection according to claim 20, wherein said first and second threading portions are disposed so that, once made up and in absence of external tensile, compressive or bonding loads, the stabbing flanks of the threads of said first threading portion of the female threaded element are in contact with those of said second threading portion of the male threaded element corresponding thereto, and the loading flanks of the threads of the second threading portion of the female threaded element are in contact with those of the first threading portion of the male threaded element corresponding thereto, providing a first buffer zone between the loading flanks of threads which correspond in the first threading portion of the female threaded element and in the second threading portion of the male threaded element, and providing a second buffer zone between the stabbing flanks of threads which correspond in the second threading portion of the female threaded element and in the first threading portion of the male threaded element, said first buffer zones being intended to take up an axial clearance in presence of a tensile load and said second buffer zones being intended to take up an axial clearance in presence of a compressive load.

22. A threaded male or female element of a component, comprising:
   a free end and at least first and second threading portions adapted to be made up onto two threading portions of a respectively female or male threaded element of another component to constitute a made up assembly with said other component, each comprising threads each comprising a stabbing flank and a loading flank, said first threading portion being closest to said free end and said second threading portion being closest to a central non-threaded portion of said component,
   wherein the stabbing flanks and the loading flanks of the threads of said first threading portion and the threads of said second threading portion are inclined in an opposed manner with respect to a radial direction.

* * * * *

UNITED STATES PATENT AND TRADEMARK OFFICE
CERTIFICATE OF CORRECTION

PATENT NO. : 8,220,844 B2  
APPLICATION NO. : 12/666486  
DATED : July 17, 2012  
INVENTOR(S) : Laurent Gillot et al.

Page 1 of 1

It is certified that error appears in the above-identified patent and that said Letters Patent is hereby corrected as shown below:

Column 8, line 43, change "doe" to --does--.

Column 9, line 11, change "angles $\Phi_{L1}$ and $\Phi_{S2}$" to --angles $\Phi_{L2}$ and $\Phi_{S2}$--.

Column 11, line 12, change "tilt" to --the--.

Column 14, line 29, change "claim 11" to --claim 1--.

Signed and Sealed this  
Second Day of October, 2012

David J. Kappos  
*Director of the United States Patent and Trademark Office*